United States Patent [19]

Yada et al.

[11] Patent Number: 5,037,681
[45] Date of Patent: Aug. 6, 1991

[54] MOLDING FOR USE WITH AN AUTOMOBILE AND PROCESS FOR MANUFACTURING THE SAME

[75] Inventors: Yukihiko Yada, Nagoya; Kazuo Shiiya, Kariya, both of Japan

[73] Assignee: Tokai Kogyo Kabushiki Kaisha, Obu, Japan

[21] Appl. No.: 489,104

[22] Filed: Mar. 6, 1990

[30] Foreign Application Priority Data

Mar. 8, 1989 [JP] Japan .................................. 1-55683

[51] Int. Cl.$^5$ ............................................ B60R 13/04
[52] U.S. Cl. .................................. 428/31; 156/244.11; 264/177.2; 293/128; 428/122; 428/358
[58] Field of Search ............... 428/31, 122, 358; 156/244.11; 264/177.2; 293/128

[56] References Cited

U.S. PATENT DOCUMENTS

| | | | |
|---|---|---|---|
| 4,101,698 | 7/1978 | Dunning et al. | 428/31 |
| 4,275,099 | 6/1981 | Dani | 428/31 |
| 4,748,062 | 5/1988 | Manjo et al. | 428/31 X |

FOREIGN PATENT DOCUMENTS

| | | | |
|---|---|---|---|
| 58-188623 | 2/1986 | Japan | 428/31 |
| 62-176058 | 11/1987 | Japan | 428/31 |

Primary Examiner—Henry F. Epstein
Attorney, Agent, or Firm—Dennison, Meserole, Pollack & Scheiner

[57] ABSTRACT

A molding for an automobile comprises a finishing film adhered to the surface of a metal strip. The finishing film comprises a flexible resin film adhered to the metal strip on one surface, and on its opposite surface, adhered to a flexible transparent resin film. The transparent film protects the flexible resin film to increase the durability of the finishing film. In the process for manufacturing the molding, an adhesive material is coated onto the metal strip, a finishing film is adhered thereby to the metal strip, and the combination of metal strip and finishing film are folded to an appropriate cross section, and seal members are attached.

10 Claims, 5 Drawing Sheets

MOLDING FOR USE WITH AN AUTOMOBILE AND PROCESS FOR MANUFACTURING THE SAME

BACKGROUND OF THE INVENTION

The present invention relates to an ornamental molding for use with an automobile and to a process for manufacturing the same, and more particularly, the invention relates to a molding which does not include an outermost coating layer and to a process for manufacturing the same.

FIGS. 14 and 15 show one of prior art roof moldings. As shown therein, a roof molding 31 of an automobile comprises a metal strip or a core metal 42 folded unsymmetrically in cross section, a resin layer 32 formed of a synthetic resin such as polyvinyl chloride (PVC) which is bonded to the outer surface of the metal strip 42 with an adhesive material 50 and is integrally provided with resilient lips 33 for sealing engagement with side walls of a fitting groove 35 formed on an automobile roof, and a coating layer 34 coated on the upper surface of the resin layer 32.

A process for manufacturing the roof molding 31 comprises the steps of applying the adhesive material 50 on the metal strip 42 folded unsymmetrically in cross section, providing the resin layer 32 on the adhesive material 50 and forming the resilient lips 33 at the edge portions of the resin layer 32, and applying a painting material on the upper surface of the resin layer 32 to form the coating layer 34.

A problem usually associated with the molding in the prior art is that the coating layer is partly peeled from the resin layer with aging, thereby causing undesirable awkward appearance of the molding.

A problem associated with the conventional process for manufacturing the molding is that such a process includes the steps of cleaning and degreasing the upper surface of the resin layer as a prefinishing step, and drying the painting material applied on the resin layer and the like; such steps have to be carefully carried out to prevent contaminants from adhering to the upper surfaces of the resin layer which would cause reduction of the adhesive power of the painting material to the resin layer.

The other prior art moldings for use with an automobile are found, for example, in Japanese Laid-Open Utility Model Publication No. 62-176058 and Japanese Laid-Open Patent Publication No. 58-188623.

SUMMARY OF THE INVENTION

It is an object of the invention to provide an upgraded molding for use with an automobile, that is, to provide a molding in which no outermost coating layer is provided so that the good appearance of the molding may be maintained for a long period of time.

It is another object of the invention to provide a manufacturing process suitable for producing the molding in which the problem associated with the conventional process is eliminated.

According to the present invention, there is provided a molding which includes a folded metal strip, a finishing film bonded to the metal strip so as to cover the upper surface and the folded portion of the metal strip, and resilient seal members bonded to the edge portions of the metal strip. The finishing film comprises a flexible resin film and a flexible transparent resin layer provided on the outer surface of the resin film.

Also, according to the present invention, there is provided a process for manufacturing a molding which includes the steps of varnishing an adhesive material on a metal strip, laminating to the surface of said adhesive material a finishing film comprising a flexible resin film covered with a flexible transparent resin layer, folding said metal strip together with said finishing film to a desired configuration, and extruding a molten resin to form resilient seal members and bonding the formed seal members onto the metal strip.

An important feature of the present invention is that the finishing film comprising the resin film covered with the transparent resin layer is used in place of the resin layer covered with the coating layer in the prior art, thereby offering the advantage that the resin film is protected by the transparent resin layer to provide a good appearance and durability thereof.

Another feature of the invention is that since the coating procedure is not used, it does not require the steps of cleaning and degreasing the upper surface of the resin layer to be coated and drying the painting material coated on the resin layer; therefore, the manufacturing process of the molding is simplified.

The present invention will become more fully apparent from the claims and the description as it proceeds in connection with the drawings.

DETAILED DESCRIPTION OF THE PREFERRED EMBODIMENTS

Figure 1:
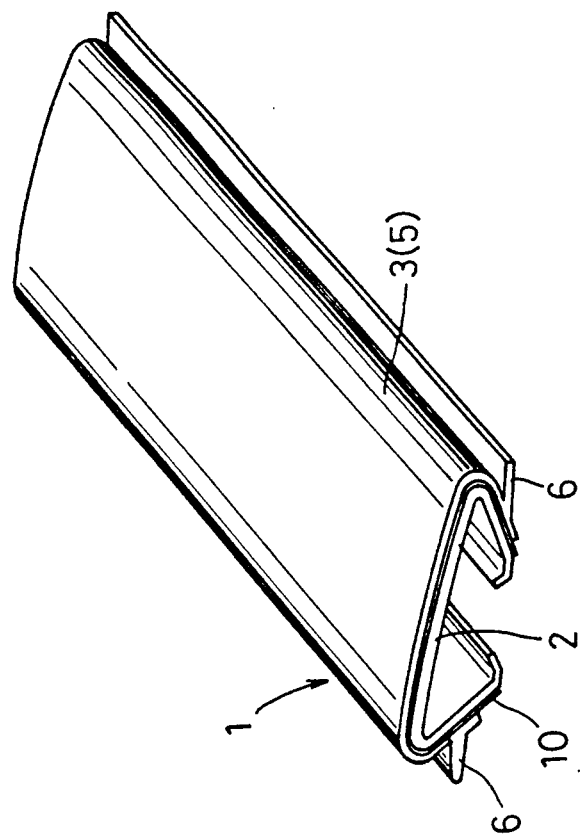
FIG. 1 is a perspective view of a molding according to a first embodiment of the present invention.

Referring now to FIGS. 1 to 8, shown therein is a molding 1 according to a first embodiment of the invention which is applicable to a roof of an automobile. For convenience in terminology, the molding 1 for use in automobile roofs will be called the roof molding. As shown in FIG. 1, the roof molding 1 comprises a folded metal strip 2, a flexible finishing film 3 bonded to the metal strip 2 so as to cover the upper flat surface and the folded surface of the metal strip 2, and resilient seal members or resilient lips 6 provided on and extending along the longitudinal edges of the metal strip 2.

Figure 4:
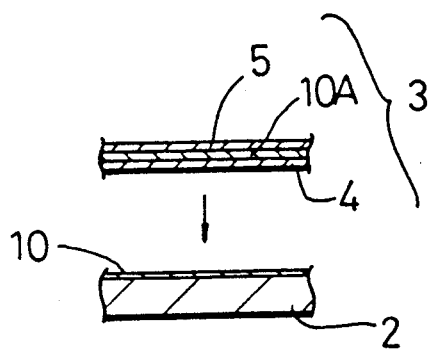
FIG. 4 is a sectional view of the finishing film and the metal strip before bonding the finishing film to the metal strip.

As shown in FIG. 4, the flexible finishing film 3 comprises a colored flexible resin film 4 and a flexible transparent resin layer 5 adhered to the outer surface of the resin film 4 with an adhesive material 10A. The resin film 4 is formed typically of PVC and is coated with a silver painting material. The adhesive material 10A and the transparent resin layer 5 is formed typically of acrylic resin and fluorocarbon resin, respectively.

Figure 2:
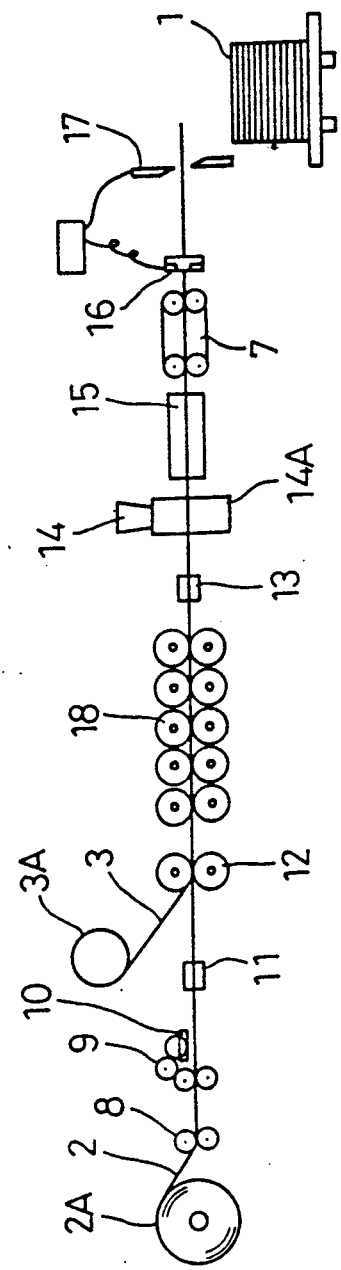
FIG. 2 is a schematic view of the production line to manufacture the molding.
Figure 3:
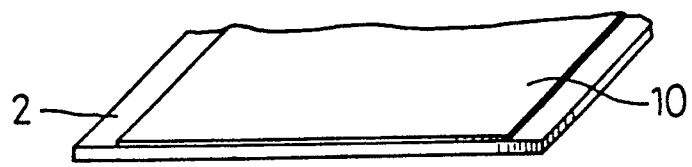
FIG. 3 is a perspective view of the metal strip varnished with the adhesive material thereon.
Figure 5:
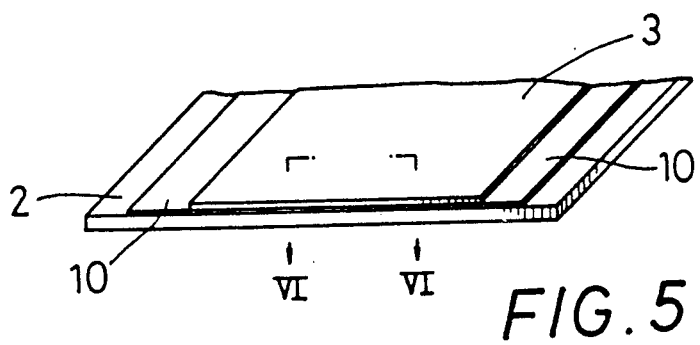
FIG. 5 is a perspective view of the metal strip covered with the finishing film.

The roof molding 1 is manufactured by several machines shown in FIG. 2. The metal strip 2 is drawn from a supply roll 2A by a drawing machine 7. The metal strip 2 passes through a guide roll 8 before entering an applicator roll 9 where an adhesive material 10 is varnished to the upper surface of the metal strip 2 (FIG. 3). Subsequent to the application of the adhesive material 10, the metal strip 2 is introduced into a heating unit 11 where the adhesive material 10 is baked to the upper surface of the metal strip 2. After passing the heating unit 11, a finishing film 3 supplied from a coil 3A is laminated on the adhesive material 10 baked onto the upper surface of the metal strip 2 in such a way that the transparent resin layer 5 forms an outermost layer (FIGS. 4 and 5). It will be noted that the finishing film 3 covers almost all the areas of the surface of the adhesive material 10 except for small areas adjacent to the longitudinal edges of the adhesive material 10.

Figure 6:
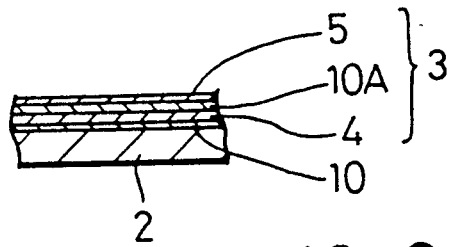
FIG. 6 is an enlarged sectional view taken along the lines VI—VI of FIG. 5.
Figure 7:
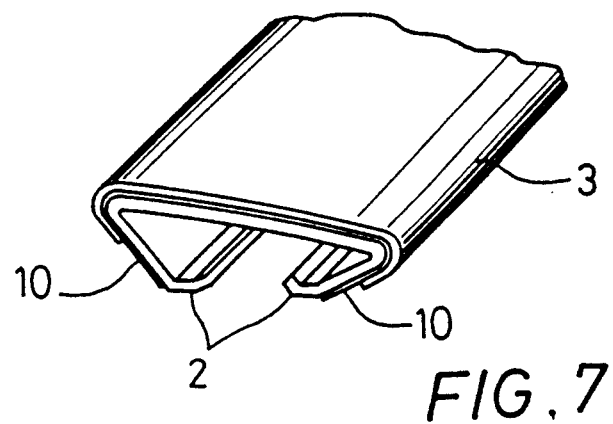
FIG. 7 is a perspective view of the folded metal strip.
Figure 8:
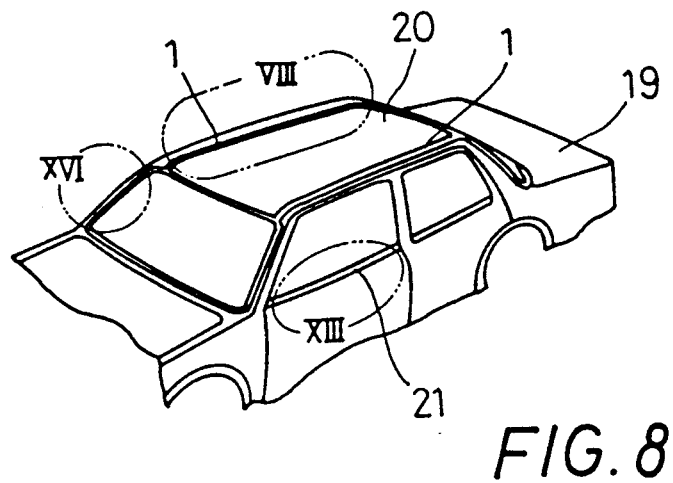
FIG. 8 is a schematic illustration of an automobile showing several portions mounted with the moldings.

The metal strip 2 laminated with the finishing film 3 subsequently passes through a press roll 12 where the finishing film 3 is sufficiently adhered to the adhesive material 10 on the metal strip 2 (FIGS. 5 and 6). Thereafter, the metal strip 2 continues to pass through a roll bender 18 having a plurality of bending rolls where the metal strip 2 is sequentially folded along both of the longitudinal edges thereof in a manner that the finishing film 3 covers the folded portions of the metal strip 2 (FIG. 7). In the folding operation, the finishing film 3 may be folded together with the metal strip 2 without separating from the adhesive material 10 because of its sufficient flexible feature.

After the folding operation at the roll bender 18, the metal strip 2 passes through another heating unit 13 to activate the adhesive material 10 which is not covered with the finishing film 3 prior to entering an extruder 14 where the resilient seal members 6 are formed and bonded to such activated layer of the adhesive material 10. The extruder 14 has a die 14A from which a molten resin such as molten PVC is extruded to form the resilient seal member 6. Such extruding operation to form the resilient seal member 6 does not cause damages to the finishing film 3 provided on the metal strip 2.

The metal strip 2 formed with the seal members 6 subsequently enters a cooling bath 15 and continues to pass through the drawing machine 7 and to enter a cutting machine 17 where the metal strip 2 is severed to form desired length of strips, thereby forming the roof molding 1 to be mounted on an automobile (FIG. 1). The setting of the length of the roof molding 1 is performed by a measuring device 16 positioned between the drawing machine 7 and the cutting machine 17. The roof molding 1 produced through such machines is assembled into fitting grooves (not shown) formed on a roof 20 of an automobile 19 after treatment procedure of forward and rearward ends thereof, as shown by broken line frame VIII in FIG. 8.

Figure 9:
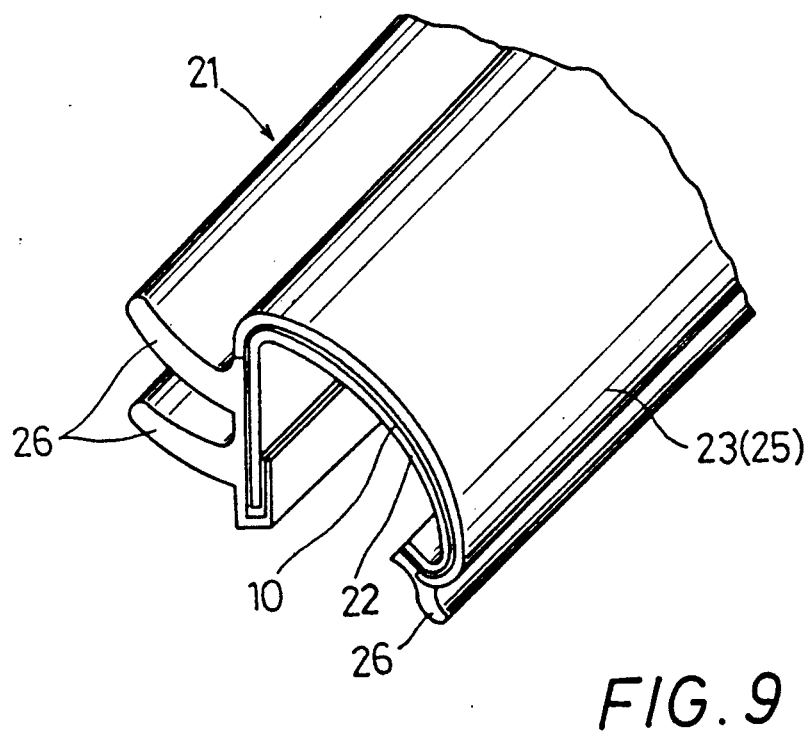
FIG. 9 is a partially cutaway perspective view of a molding according to a second embodiment of the present invention.

Referring now to FIGS. 9 to 13, shown therein is a molding 21 according to a second embodiment of the invention which is applicable to a door of an automobile. For convenience in terminology, the molding 21 for use in automobile doors will be called the door molding. As shown in FIG. 9, the door molding 21 comprises a folded metal strip 22, a flexible finishing film 23 laminated to the upper flat surface and the folded portion of the metal strip 22 with an adhesive material 10, and resilient seal members or resilient strips 26 bonded to the longitudinal edges of the metal strip 22 with the adhesive material 10.

Figure 10:
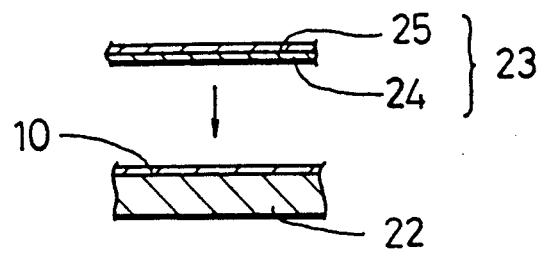
FIG. 10 is a sectional view of the finishing film and the metal strip before bonding the film to the metal strip.

As shown in FIG. 10, the flexible finishing film 23 comprises a colored flexible resin film 24 to which a flexible transparent resin layer 25 is directly laminated. In this embodiment, the resin film 24 is formed of PVC and is coated with a white painting material, and the transparent resin layer 25 is formed of urethane resin.

Figure 11:
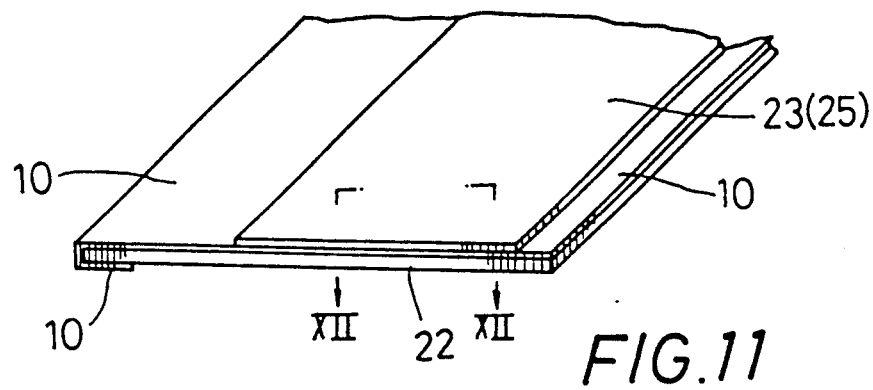
FIG. 11 is a perspective view of the metal strip covered with the finishing film.
Figure 12:
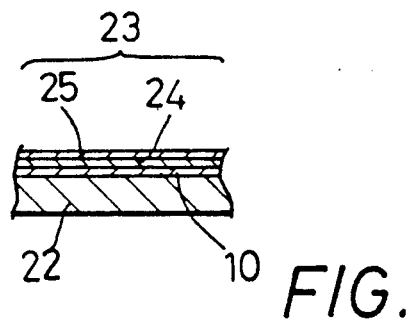
FIG. 12 is an enlarged sectional view taken along the lines XII—XII of FIG. 11.
Figure 13:
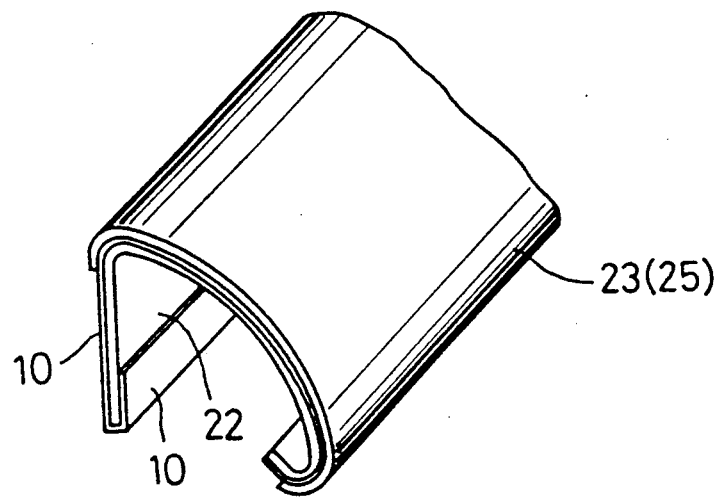
FIG. 13 is a perspective view of the folded metal strip.
Figure 14:
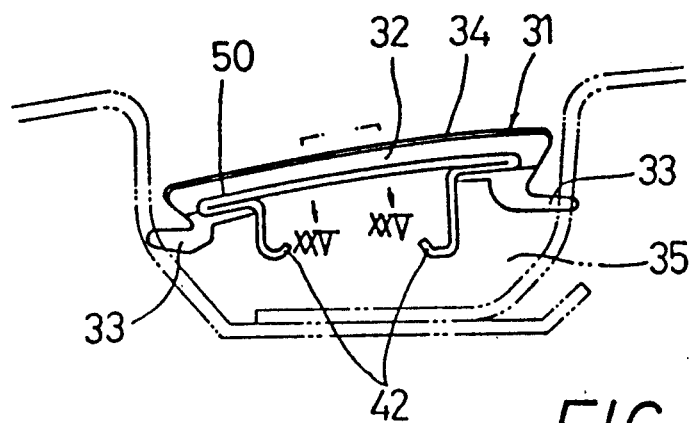
FIG. 14 is a sectional view of a conventional molding.
Figure 15:
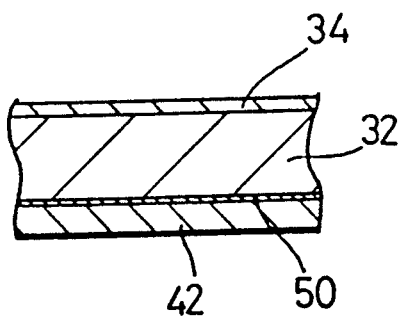
FIG. 15 is an enlarged sectional view taken along the lines XV—XV of FIG. 14.

The door molding 21 is manufactured by machines similar to those shown in FIG. 2. The metal strip 22 drawn from the coil 2A enters the applicator roll 9 where the adhesive material 10 is varnished to the upper surface, one of the side surface and a part of the lower surface of the metal strip 22. The construction of the applicator roll 9 is partially modified from that of the applicator roll 9 of the first embodiment so that the adhesive material 10 is applied to the upper surface, one of the side surfaces and a desired part of the lower surface of the metal strip 22. Subsequent to the application of the adhesive material 10, the metal strip 22 is introduced into a heating unit 11 where the adhesive material 10 is baked to the respective surfaces of the metal strip 22. After passing the heating unit 11, a finishing film 23 supplied from a coil 3A is laminated on the adhesive material 10 baked onto the upper surface of the metal strip 22 in such a way that the transparent resin layer 25 forms an outermost layer (FIGS. 10 and 11). It will be noted that the finishing film 23 covers the desired central areas of the adhesive material 10 applied on the upper surface of the metal strip 22. The metal strip 22 subsequently enters the press roll 12 for sufficiently adhering the finishing film 23 to the metal strip 22 (FIGS. 11 and 12). After passing through the press roll 12, the metal strip 22 continues to pass through a roll bender 18 having a plurality of bending rolls where the metal strip 22 is sequentially folded along with both of the longitudinal edges thereof in a manner that the finishing film 23 covers the folded portions of the metal strip 22 (FIG. 13). In the folding operation, the finishing film 23 may be folded with the metal strip 22 without separating from the adhesive material 10 because of its sufficient flexible feature.

After passing through the folding station, the metal strip 22 enters another heating unit 13 to activate the adhesive material 10 which is not covered with the finishing film 23 before entering the extruder 14 where the resilient seal members 26 are formed and bonded to such activated layer of the adhesive material 10. The resilient seal member 26 may be formed of a synthetic resin such as PVC. As apparent from FIG. 9, the resilient seal member 26 is configured to enclose one of the side surface and a part of the lower surface of the metal strip 22, so that the seal member 26 is fixedly connected to the metal strip 22.

The metal strip 22 formed with the seal members 26 subsequently enters a cooling bath 15 and continued to enter the cutting machine 17 where the metal strip 22 is cut to form desired length of strips, thereby forming the door molding 21 to be mounted on an automobile (FIG. 9). The door molding 21 is assembled into the groove (not shown) formed on a door of an automobile 19 after treatment procedure of forward and rearward ends thereof, as shown by broken line frame XIII in FIG. 8.

The preferred embodiments herein described are intended to be illustrative of the inventions and not to limit the inventions to the precise form herein described. They are chosen and described to explain the principles of the invention and their application and practical use to enable others skilled in the art to practice the invention. Accordingly, the invention may be applied to another molding such as a window molding having a weather strip, as shown by broken line frame XVI in FIG. 8.

What is claimed is:

1. A molding for an automobile comprising:
    an elongated metal strip folded longitudinally in the vicinity of each longitudinal edge to produce an outwardly facing central portion and two outwardly facing edge portions;
    a finishing film adhesively bonded to said metal strip so as to cover said outwardly facing central portion and at least a part of said edge portions, said finishing film comprising a flexible resin film and a transparent resin film, said flexible resin film being adhesively bonded on one surface to said metal strip and on the opposite surface to said flexible transparent resin film; and
    a resilient seal member bonded to and extending outwardly from each edge portion.

2. The molding as defined in claim 1, wherein said flexible resin film is adhesively bonded to said flexible transparent resin film by an acrylic resin.

3. The molding as defined in claim 1, wherein said transparent flexible resin film is adhered directly to said resin film.

4. The molding as defined in claim 2, wherein said transparent flexible resin film is formed of fluorocarbon resin.

5. The molding as defined in claim 3, wherein said transparent flexible resin film is formed of urethane resin.

6. The molding as defined in claims 4 or 5, wherein said flexible resin film is formed of colored polyvinyl chloride.

7. A process for manufacturing a molding for use with an automobile, comprising the steps of:
    coating an adhesive material on a metal strip;
    laminating to the surface of said adhesive material a finishing film comprising a flexible resin film having one surface laminated to said adhesive material and an opposite surface adhered to a flexible transparent resin film;
    folding said metal strip together with said finishing film to a desired configuration in cross section; and
    extruding a molten resin to form resilient seal members and bonding the formed seal members onto said metal strip.

8. The process as defined in claim 7 further comprising a step of baking said adhesive material to said metal strip.

9. The process as defined in claim 8 further comprising a step of pressing said metal strip laminated with said finishing film to firmly adhere said finishing film onto said metal strip.

10. The process as defined in claim 9 further comprising a step of activating said adhesive material before extruding said seal members.

* * * * *